United States Patent
Rosenquist (10) Patent No.: US 7,249,775 B2
(45) Date of Patent: Jul. 31, 2007

(54) WHEEL SUSPENSION

(76) Inventor: Johan Rosenquist, Drakenbergsgatan 61, Stockholm (SE) S-117 41

( * ) Notice: Subject to any disclaimer, the term of this patent is extended or adjusted under 35 U.S.C. 154(b) by 246 days.

(21) Appl. No.: 10/487,454

(22) PCT Filed: Aug. 29, 2002

(86) PCT No.: PCT/SE02/01537

§ 371 (c)(1),
(2), (4) Date: Feb. 24, 2004

(87) PCT Pub. No.: WO03/018335

PCT Pub. Date: Mar. 6, 2003

(65) Prior Publication Data

US 2004/0232643 A1 Nov. 25, 2004

(30) Foreign Application Priority Data

Aug. 30, 2001 (SE) .................................. 0102878

(51) Int. Cl.
*B60G 9/02* (2006.01)
(52) U.S. Cl. ............. 280/124.11; 180/21; 280/124.116; 280/124.158; 280/124.161; 301/127
(58) Field of Classification Search .......... 280/124.11, 280/124.116, 124.158, 124.161; 180/21; 301/127
See application file for complete search history.

(56) References Cited

U.S. PATENT DOCUMENTS

| | | | | |
|---|---|---|---|---|
| 1,149,153 A | * | 8/1915 | Schleicher | 180/23 |
| 2,740,623 A | | 4/1956 | Schlegel | |
| 4,360,212 A | * | 11/1982 | Scigalski | 280/124.107 |
| 6,428,026 B1 | * | 8/2002 | Smith | 280/124.125 |

FOREIGN PATENT DOCUMENTS

GB   2 151 746   7/1985

* cited by examiner

*Primary Examiner*—Eric Culbreth
(74) *Attorney, Agent, or Firm*—Young & Thompson

(57) ABSTRACT

A wheel suspension for vehicles. The invention relates to both double axle vehicles and single axle vehicles. Feasible areas of use are: prams, carts (pulled manually or by a vehicle), walkers, wheel chairs, skateboards, luggage carts and motor vehicles. It is significant for the wheel suspension that the centre axles (15a, 15b) of wheels (11a, 11b) of a set of wheels are connected to elements (14a, 14b) that extend in the travelling direction of the vehicle, that these elements (14a, 14b) are hingedly/pivotally connected to a frame (1') of the vehicle, that the centre axles (15a, 15b) for adjacent wheels (11a, 11b) are located at a certain distance from each other in the longitudinal direction/travelling direction (2) of the vehicle.

8 Claims, 10 Drawing Sheets

WHEEL SUSPENSION

TECHNICAL FIELD OF THE INVENTION

The present invention relates to a wheel suspension for vehicles. The invention relates to both multi axle vehicles and single axle vehicles. For the present invention the following feasible areas of use may be mentioned: prams, pallet lifters, carts (pulled manually or by a vehicle), walkers, wheel chairs, lagguage carts, wheelbarrows and motor vehicles. Generally, the invention is applicable for relatively seen small wheels or compact wheel units that get stuck in cavities.

PRIOR ART

From GB 573,764 a wheel suspension of a pram is previously known, said wheel suspension facilitating the transfer of the pram between different levels and across obstacles. For this purpose the pram has a wheel suspension where the wheel carrying axis has an intermediate portion which is recessed relative to the portions of the axis that carry the wheels, this being the case when the pram is located on a planar ground. Said intermediate portion supports, via springs, the seat unit. The fundamental principle of the wheel suspension is that a pushing force upon the pram is, at least partly, transferred to an elevating force due to the fact that the intermediate portion rotates relative to the wheel carrying portions.

OBJECTS AND FEATURES OF THE INVENTION

A primary object of the present invention is to present a wheel suspension of the type defined above, said wheel suspension having an improved function as regards the compensation of the vertical movements that the wheels are subjected to when by-passing unevennesses in the ground that the wheels are travelling on. Thereby, an evened motion is achieved for the vehicle being equipped with the wheel suspension.

A further object of the present invention is that the structural design of the wheel suspension should be simple and hence inexpensive to manufacture.

Still an object of the present invention is that according to a preferred embodiment of the invention the wheel suspension has an inherent spring function.

BRIEF DESCRIPTION OF THE DRAWINGS

Below embodiments of the invention will be described, reference being made to the enclosed drawings, where:

FIGS. 6a-6c show a detail of a pair of wheels in different phases when said pair of wheels by-passes a groove in a pavement or the like;

DETAILED DESCRIPTION OF PREFERRED EMBODIMENTS OF THE INVENTION

Figure 1:
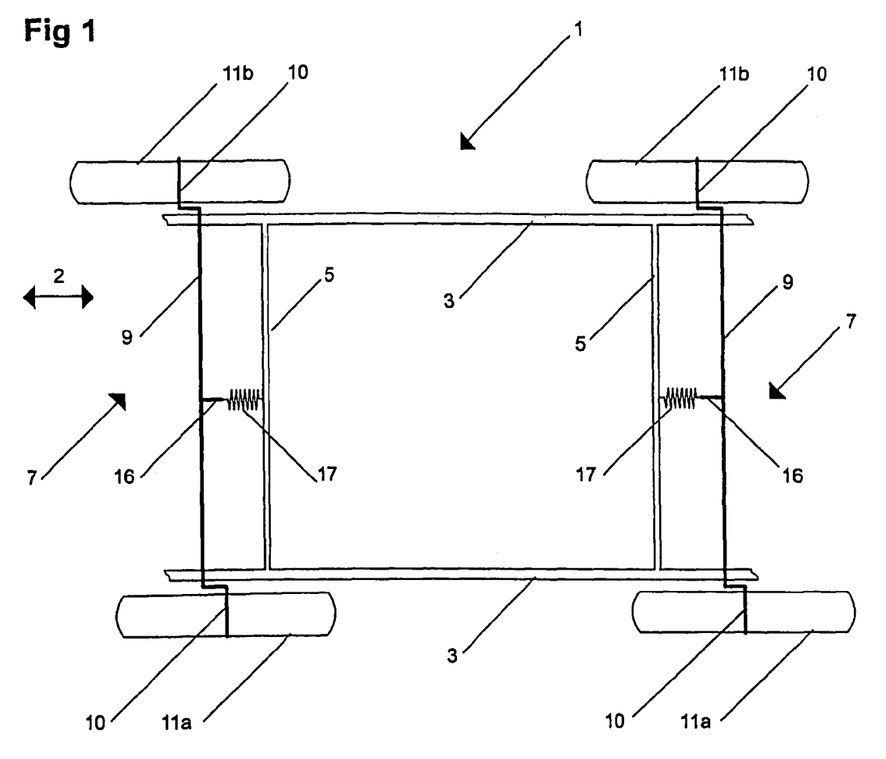
FIG. 1 shows a schematic top view of a pram chassis, said chassis being equipped with a wheel suspension according to the present invention.
Figure 2:
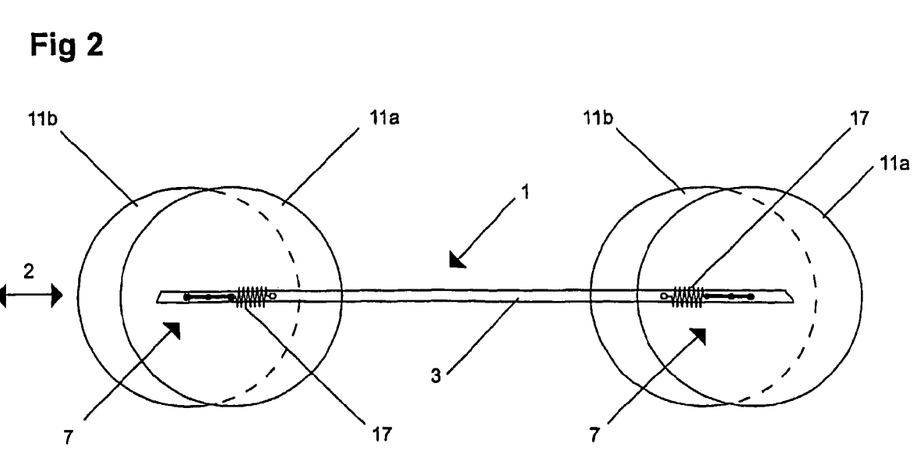
FIG. 2 shows a schematic side view of the pram chassis according to FIG. 1.

The pram chassis shown in FIGS. 1 and 2 comprises a frame 1 that in its turn comprises two longitudinal first rods 3 and two transverse second rods 5, said first rods 3 and said second rods 5 being mutually connected in a suitable way, e.g. by means of welding, in order to provide a rigid frame 1 that is able to handle the forces acting on the frame 1.

In the area of both ends of the frame 1, seen in the longitudinal direction of the frame 1, an axle 7 is provided, said axle 7 constituting an essential element of the wheel suspension according to the present invention. The axle 7 comprises an intermediate portion 9 and two generally Z-shaped portions 10 that are provided at both ends of the intermediate portion 9. Upon the free ends of the Z-shaped portions 10 wheels 11a and 11b are rotatably mounted in a suitable way. The wheels that are located at the bottom in the top view according to FIG. 1 are designated 11a while the wheels that are located at the top in the top view according to FIG. 1 are designated 11b. The unit that is defined by the axle 7 and the wheels 11a and 11b is called a set of wheels.

Figure 3:
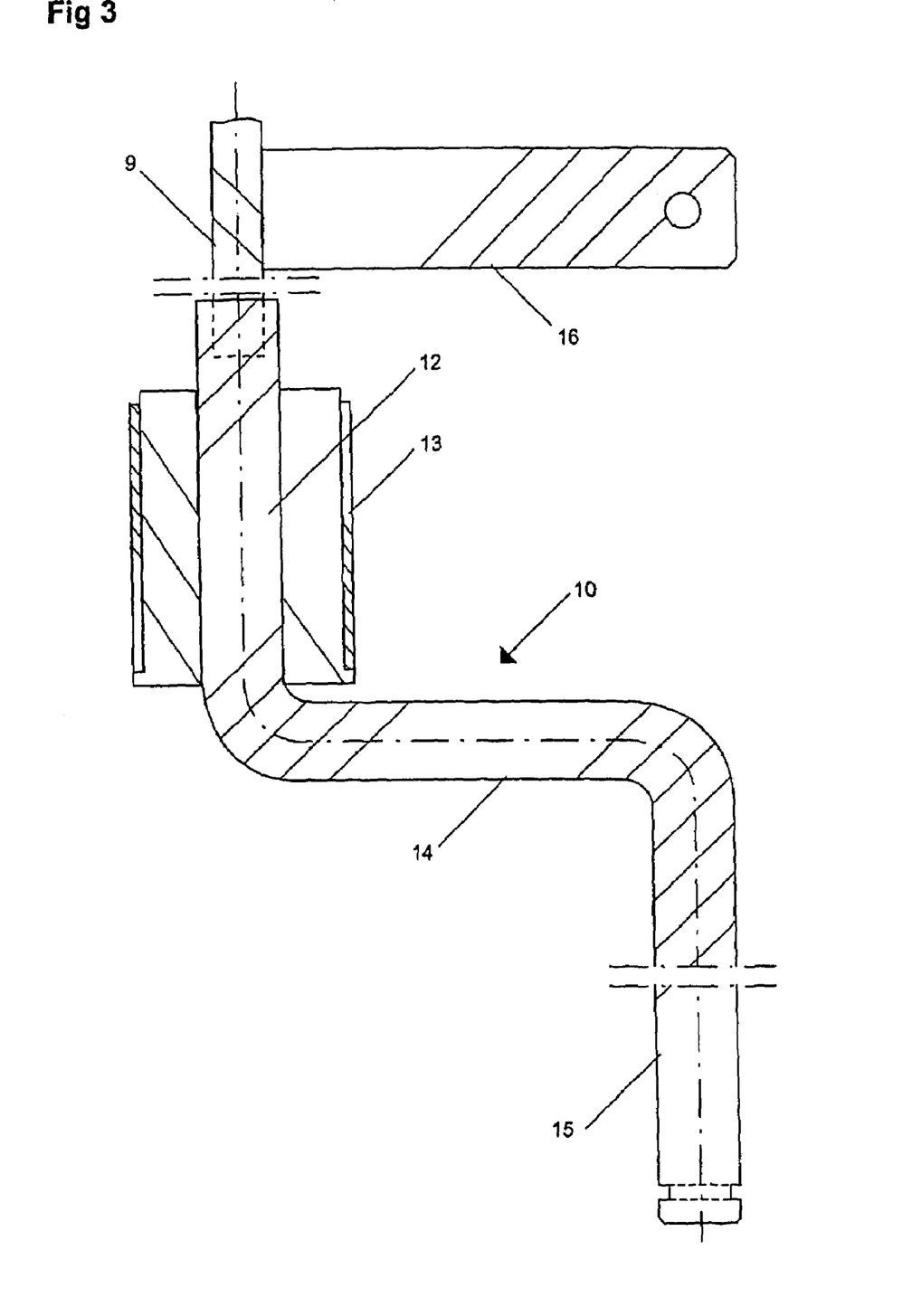
FIG. 3 shows a detail of a Z-shaped portion that is included in the wheel suspension according to the present invention.

In FIG. 3 the Z-shaped portion 10 is shown in detail. An inner portion 12 of the Z-shaped portion 10 is rotatably received in a bearing 13 that is supported by the frame 1. The bearing 13 is preferably a so-called teflon bearing. The Z-shaped portion 10 also includes an intermediate portion 14 that projects from the inner portion 12, and an outer portion 15 that projects from the end of the intermediate portion 14 that faces away from the inner portion 12. Since the portion 10 generally is Z-shaped the intermediate portion 14 has a longitudinal direction that extends transverse to the longitudinal direction of the inner portion 12 and the outer portion 15 has a longitudinal direction that extends transverse to the longitudinal direction of the intermediate portion 14. Preferably, the longitudinal direction of the intermediate portion 14 is perpendicular to the longitudinal direction of the inner portion 12 and the outer portion 15 and the longitudinal directions of the inner portion 12 and the outer portion 15 are parallel. On the outer portion 15 a wheel (not shown in FIG. 3) is mounted, said wheel being rotatable relative to the outer portion 15. The intermediate portion 14 has an extension in the longitudinal direction/travelling direction of the pram, said direction being illustrated by the double arrow 2 in FIGS. 1 and 2.

One end of the intermediate portion 9 is received at the free end of the inner portion 12. The connection between the Z-shaped portion 10 and the intermediate portion 9 should be rigid. The connection is preferably achieved by drilling and welding. The intermediate portion 9 is preferably manufactured from spring steel while the Z-shaped portion 10 preferably is manufactured from a stiffer steel quality. The importance of this will be explained below in connection with the description of the function of the wheel suspension.

As is evident from FIGS. 1 and 3 an iron flat 16 is rigidly attached at the middle of each intermediate portion 9. As is evident from FIG. 1 a first spring 17 is mounted between the iron flat 16 and the adherent transverse second rod 5. The function of the arrangement with the iron flat 16 and the first springs 17 will be described below. The first springs 17 constitute tension springs.

Figure 4:
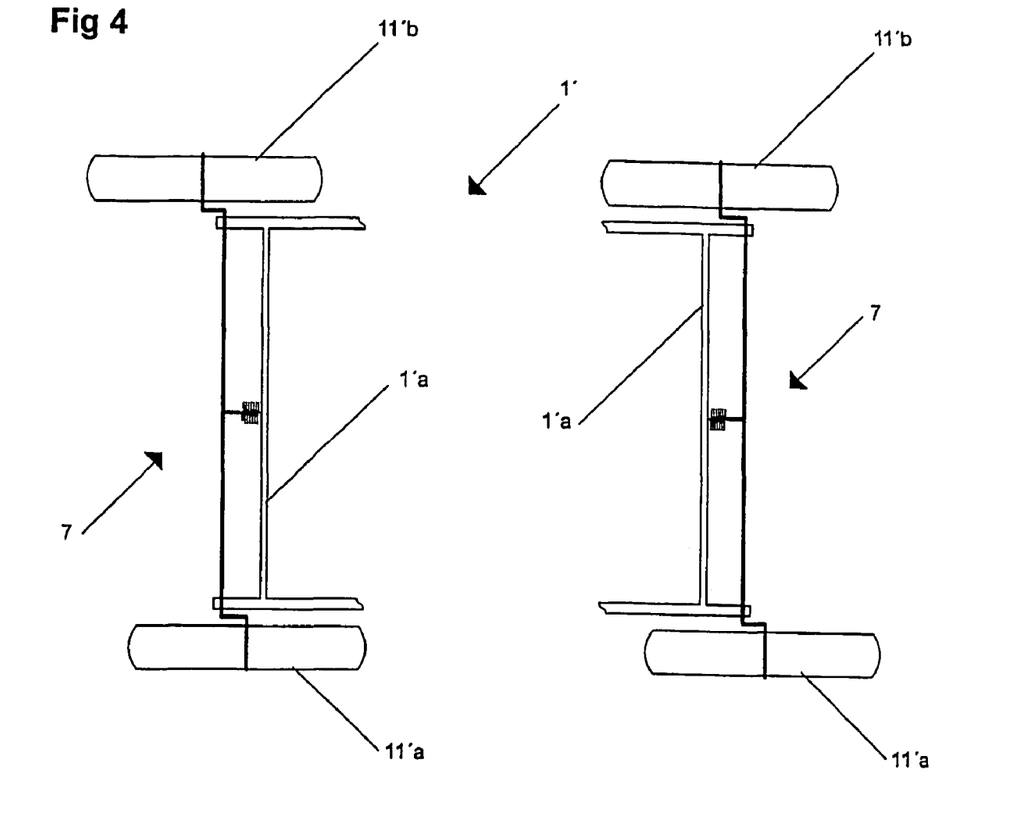
FIG. 4 shows a schematic top view of a pram chassis of a sulky, said chassis being equipped with a wheel suspension according to the present invention.
Figure 5:
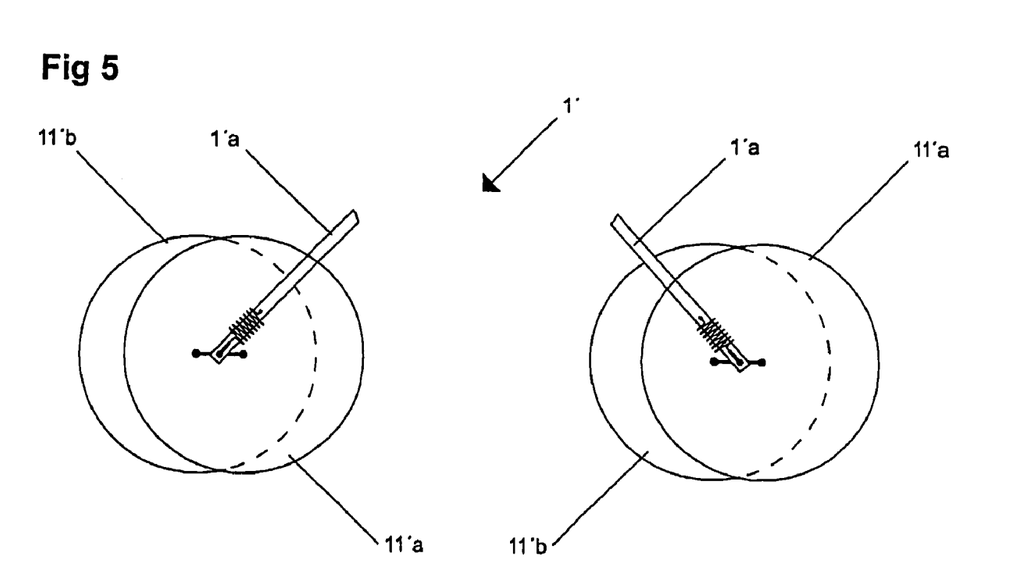
FIG. 5 shows a schematic side view of the pram chassis according to FIG. 4.

In the alternative embodiment of the present invention shown in FIGS. 4 and 5 the wheel suspension is applied to a sulky. In connection therewith only the areas of the ends of the frame 1' is shown, said ends receiving the two axles 7 that have a principally similar design as the axles 7 according to FIGS. 1-2. For this reason the axles of FIGS. 45 have been given the reference numerals 7 and the wheels have been given the reference numerals 11'a, 11'b.

When viewing FIGS. 4 and 5 it is realized that the frame 1' has a different design compared to the frame 1. Thus the frame 1' comprises two subframes that are only partly shown in FIGS. 4 and 5. In areas where they cross each other the sub frames 1' are in a conventional way hingedly connected to each other.

Figure 6A:
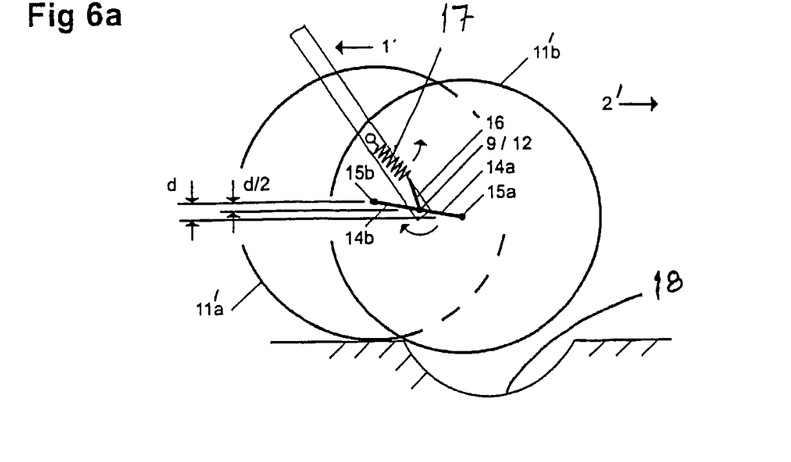
Figure 6B:
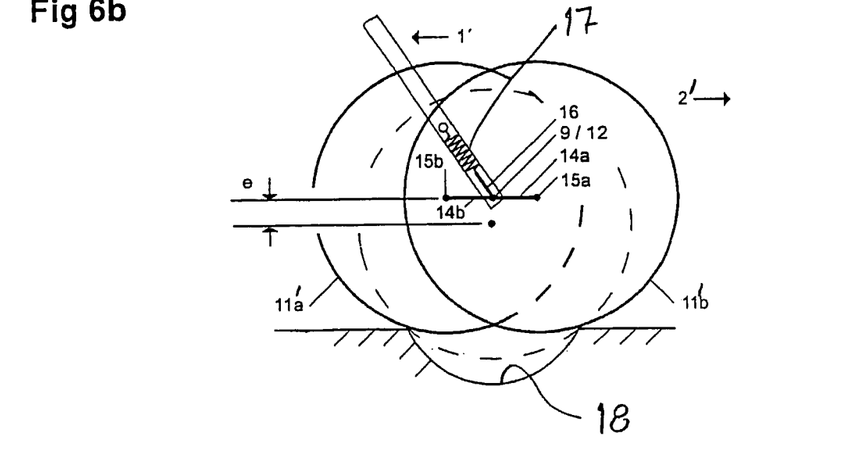
Figure 6C:
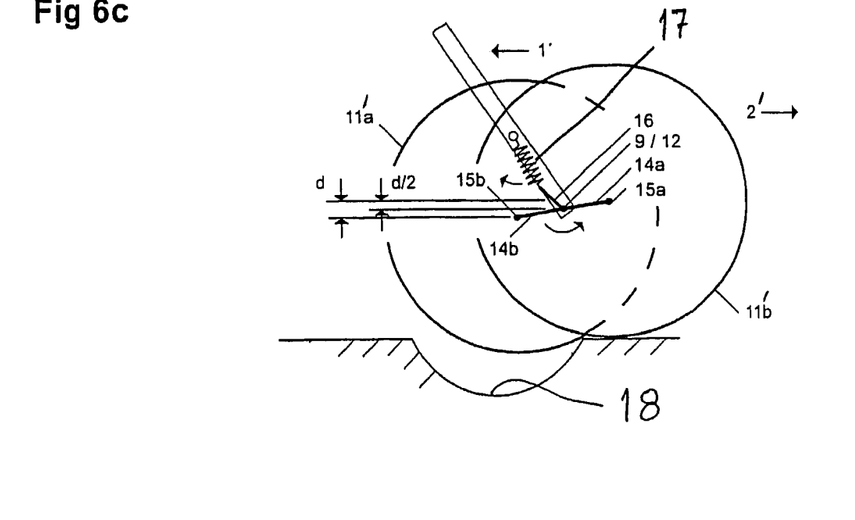

In FIGS. 6a-6c the "behavior" of the wheels 11'a, 11'b is schematically illustrated when they pass for instance a groove 18 in a pavement, the wheels 11'a, 11'b being attached to an axle 7 in accordance with the invention. In order to distinguish the Z-shaped portions at respective end of the axle 7, said portions have been given the additional designation "a" and "b" respectively in conformity with the designation of the wheels 11'a and 11'b at respective ends of the axle 7.

In the illustrated example the groove 18 has such a width that the wheel 11'a that travels at the front in the longitudinal direction/travelling direction of the pram remains hanging in the air due to the structural design of the wheel suspension according to the present invention. The longitudinal direction/travelling direction is illustrated by the arrow 2' in FIGS. 6a-6c. When the front travelling wheel 11'a loses its contact with the ground it will move downwards on one hand due to the weight of the wheel 11'a and on the other hand due to the load that the frame 1' applies to the intermediate portion 9 of the axle 7. The distance that the center axle 15a of the front wheel 11a moves downwards in relation to the center axle 15b of the rear wheel 15b is designated by d in FIG. 6a. When the center axle 15a of the front wheel 11'a strives to move downwards due to the applied forces described above, the downwards movement will be counteracted by the first tension spring 17, see FIG. 6a, that strives to return the iron flat 16 to its initial position. When the iron flat 16 is turned a certain predetermined angle from its initial position the tension spring 17 will become elongated a certain distance. If further turning of the iron flat 16 occurs beyond the predetermined angle the tension spring 17 will be elongated more compared to the turning from the initial position. The fact that the intermediate portion 9 is designed as a torque axle brings about an inherent spring suspension that gives the pram chassis an evened travel across unevennesses in the ground. This is especially important when an axle is subjected to a load and both wheels are pushed upwards simultaneously. An extremely important feature of the wheel suspension according to the present invention is the fact that the intermediate portion 9 of the axle 7 only moves downwards about half the distance that the center axle 15a moves downwards, this being evident from FIG. 6a, where the distance that the intermediate portion 9 moves downwards is designated by d/2.

In FIG. 6b it is shown how the pair of wheels 11'a, 11'b is located in the middle of the groove 18 and respective wheels 11'a, 11'b abut the opposite edges of the groove 18. In FIG. 6b it is also illustrated how a conventional pair of wheels behaves when passing the groove 18, the wheel in this case being dotted along its entire circumference. The conventional pair of wheels symbolized by the dotted wheel, will descend into the groove 18 to an essentially larger degree than the pair of wheels 11'a, 11'b according to the present invention. The distance that the conventional pair of wheels moves downwards in the groove 18 has been designated by "e" in FIG. 6b.

In FIG. 6c the behavior of the pair of wheels 11'a, 11'b is illustrated when the pair of wheels leaves the groove 18, this in principle being mirror-inverted compared to FIG. 6a.

In FIG. 6a-6c it is illustrated the case when the front wheel 11'a runs down in a groove 18 or the like. However, the wheel suspension according to the present invention functions equal well if the front wheel 11'a runs over an elevation in the ground. In such a case the front wheel 11'a will be raised relative to the rear wheel 11'b. However, the wheel suspension will function in principally the same way as regards the evening effect upon unevennesses in the ground.

For security reasons the structure shown in FIGS. 6a-6c should be equipped with some kind of deflection limiter to prevent the wheel suspension from tilting to one side in an uncontrolled manner if a large load is applied to said side. In such a case several different solutions are feasible, for example the type of deflection limiter that is shown in the embodiments described below. It is also feasible that the deflection limiter is integral with the spring in such a way that the spring is allowed to be extended/compressed only a certain distance before it reaches a stop.

Figure 7:
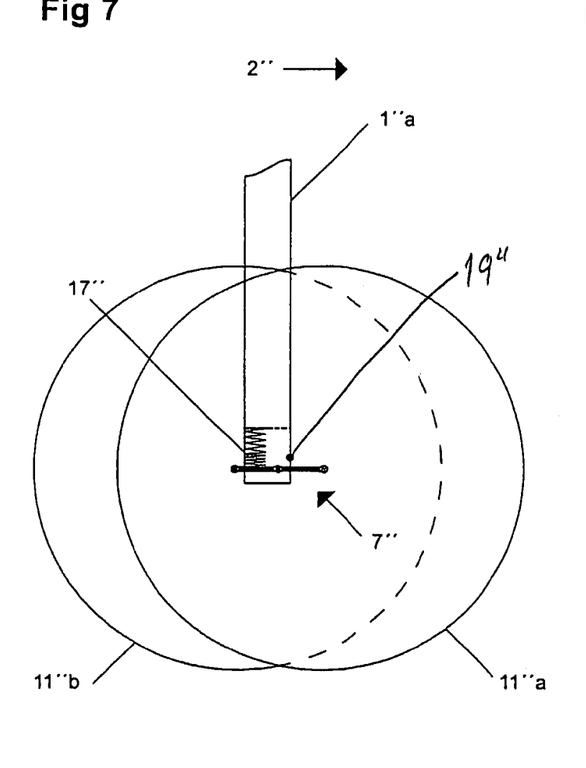
FIG. 7 shows a side view of a pair of wheels in connection with a so called umbrella stroller.
Figure 8:
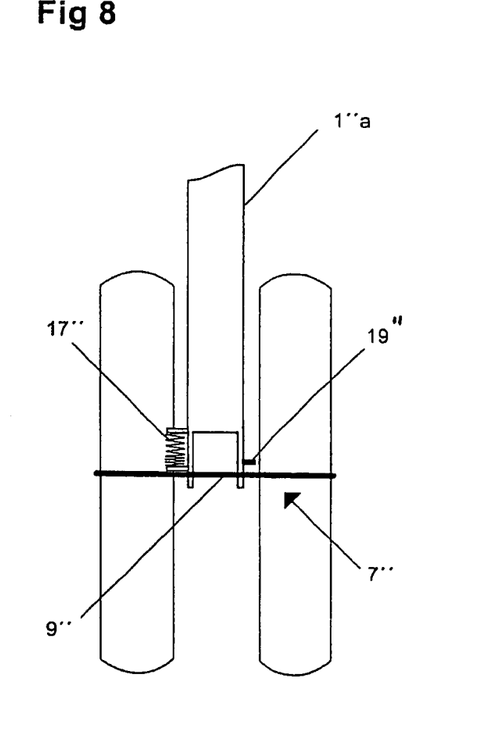
FIG. 8 shows a front view of the pair of wheels according to FIG. 7.
Figure 9:
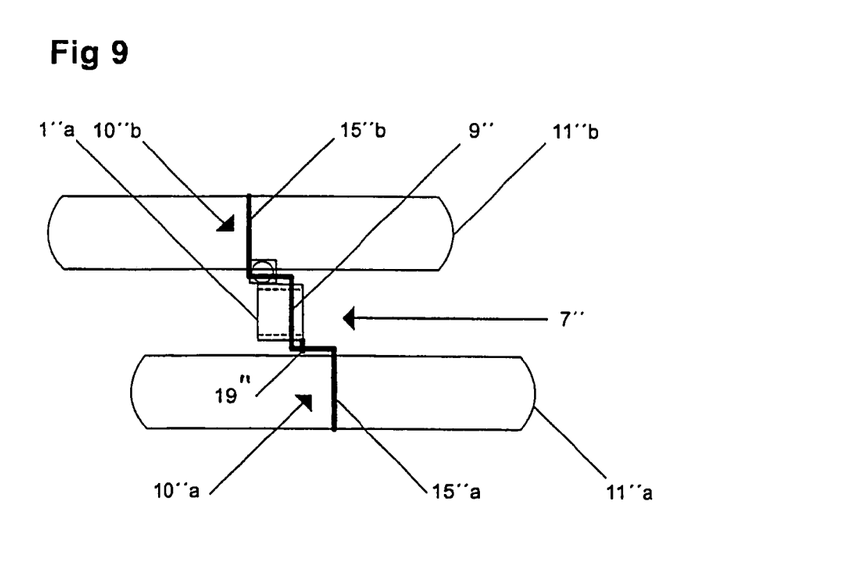
FIG. 9 shows a top view of the pair of wheels according to FIG. 7.

The wheel suspension according to the present invention that is schematically shown in FIGS. 7-9 is applied to a set of wheels comprising a pair of wheels of a so-called umbrella stroller. In this case an axle 7" is rotatably attached to a rear subframe 1"a of the umbrella stroller, said axle 7" having a intermediate straight portion 9". The umbrella stroller comprises four such sub-frames that are included in the frame of the umbrella stroller. The axle 7" also comprises two Z-shaped portions 10"a and 10"b respectively, that are arranged at respective ends of the intermediate portion 9". Each of the Z-shaped portions 10" comprises an outer portion 15"a and 15"b respectively that are parallel to the intermediate portion 9". On the outer portions 15"a and 15"b wheels 11"a and 11"b are mounted, said outer portions 15"a and 15"b constituting centre axles for the wheels 11"a and 11"b. As is most evident from FIGS. 7 and 8 a first compression spring 17", preferably a progressive compression spring, is mounted between the axle 7" and a fixed bracket on the sub-frame 1"a. The first compression spring 17" has principally the same function as the first tension spring 17 in the embodiments described above, however with the difference that the lower end of the compression spring 17" is not attached to the axle 7". This means that when the front wheel 11"a enters a curb or the like the portion of the axle 7" that is located directly opposite the compression spring 17", i.e. the rear portion of the axle 7", will move away from the compression spring 17" that thus is inactive. This structural design brings about that the set of wheels according to FIGS. 7-9 easily rolls over an obstacle. However, to guarantee that the wheel suspension according to FIGS. 7-9 not is subjected to an uncontrolled rotation, when for instance the front wheel passes over a large upright obstacle, the embodiment according to FIGS. 7-9 is equipped with a stop 19". Otherwise the embodiment according to FIGS. 7-9 functions in principally the corresponding way as the embodiments according to FIGS. 1-2 and FIGS. 4-5 respectively, the most evident structural difference being that the intermediate portion 9" is essentially shorter in the embodiment according to FIGS. 7-9 than in the embodiments according to FIG. 12 and FIGS. 4-5 respectively.

Figure 11:
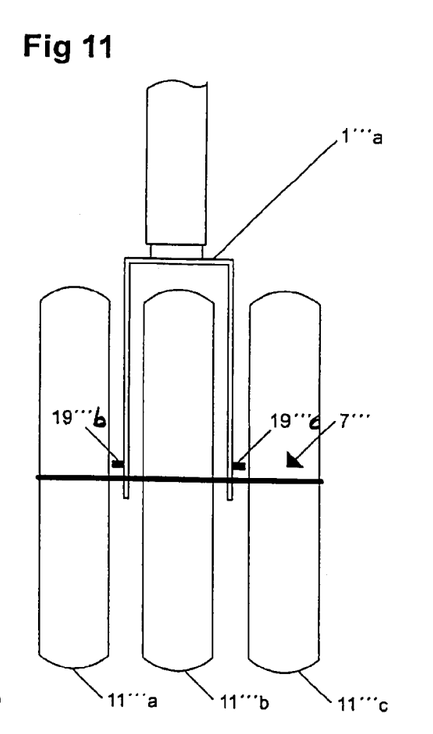
FIG. 11 shows a front view of the set of wheels according to FIG. 10.
Figure 12:
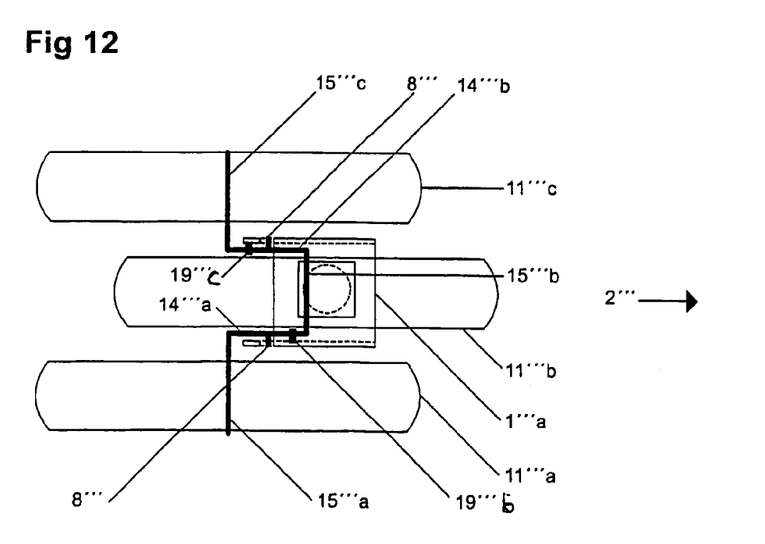
FIG. 12 shows a top view of the set of wheels according to FIG. 10.
Figure 13A:
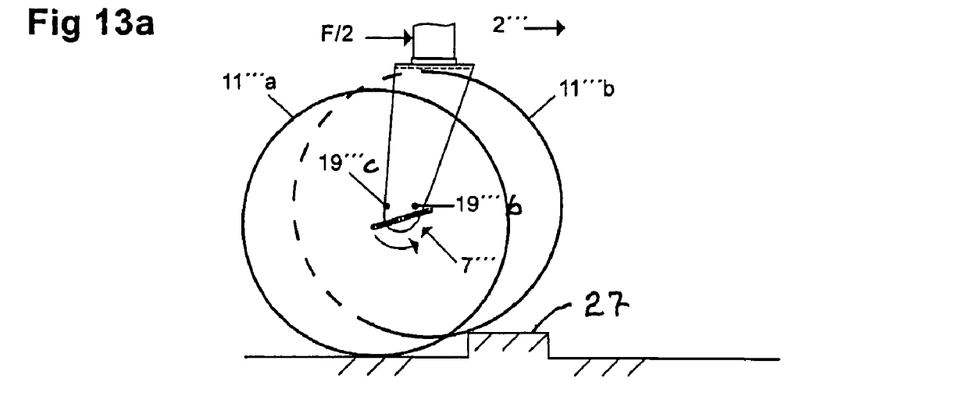
FIGS. 13a-13c show schematically different phases when the set of wheels according to FIGS. 10-12 bypasses an upright obstacle.
Figure 13B:
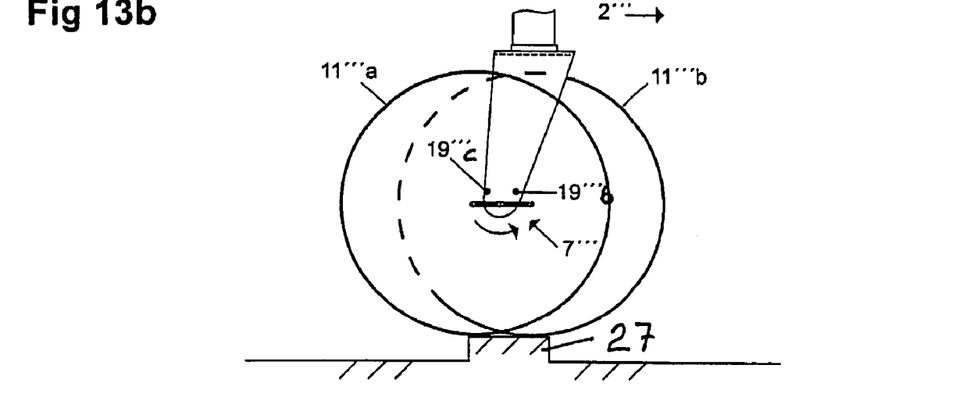
Figure 13C:
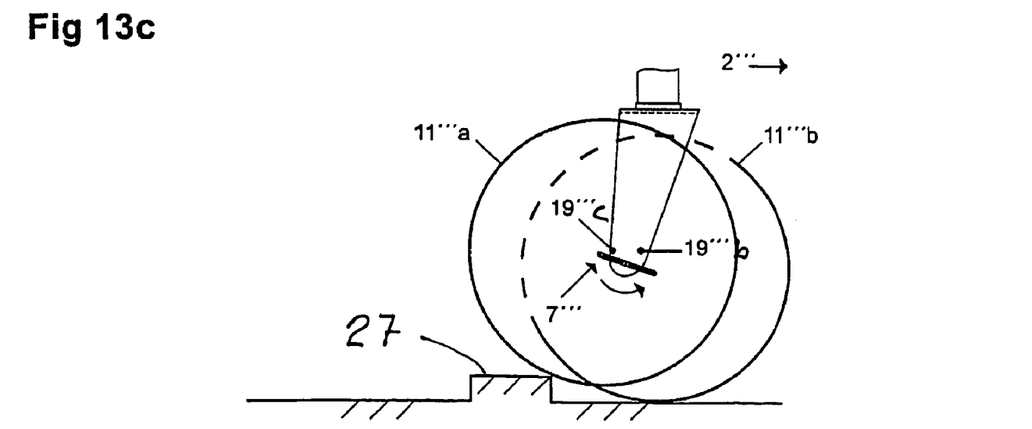

In FIGS. 10-12 and FIGS. 13a-13c a further alternative embodiment is shown where three wheels 11'''a, 11'''b, 11'''c define a set of wheels. In this case the Ω-axle 7''' that carries the wheels 11'''a, 11'''b, 11'''c constitutes in principle two assembled Z-axles and the centrally located centre axle 15'''b of the axle 7''' is displaced in the longitudinal direction/travelling direction 2''' of the vehicle relative to the two other centre axles 15'''a and 15'''c. The axle 7''' is pivotally suspended in a subframe 1'''a by means of pins 8'''. Further, two stops 19'''b and 19'''c are attached to the sub-frame 1'''a in order to limit the pivoting of the axle 7'''. In FIGS. 13a-13c it is schematically illustrated how the set of wheels in the embodiment according to FIGS. 10-12 behaves when it passes an upright obstacle 27. In connection therewith the wheel 11'''b travelling first in the longitudinal direction/travelling direction 2''' of the vehicle will move upwards as it loses its contact with the ground, see FIG. 13a. In connection therewith the stop 19'''b guarantees that there is no uncontrolled rotation of the front wheel 11'''b relative to the rear wheels 11'''a and 11'''c. The stop 19'''b functions in such a way that the intermediate portion 14'''a will abut said stop 19'''b when the upwards movement of the front wheel 11'''b has reached a predetermined value. In connection therewith uncontrolled rotation of the front wheel 11'''b is prevented. Empirically it has been shown that the required force in the travelling direction of the vehicle to transfer the wheel suspension from the position according to FIG. 13a to the position according to FIG. 13b is only half the force that is required in connection with a conventional wheel suspension, i.e. when the wheels simultaneously are elevated on top of the upright obstacle 27. This has been illustrated in FIG. 13a by the designation F/2 of the required force.

In FIG. 13b it is shown the position when all three wheels 11'''a, 11'''b and 11'''c are located on top of the upright obstacle 27. In FIG. 13c the front wheel 11'''b has left the upright obstacle 27 and remained hanging in the air before it has reached down to the level of the ground that surrounds the upright obstacle 27. If the difference in height is sufficiently large, the intermediate portion 14'''b will abut the stop 19'''c.

Figure 10:
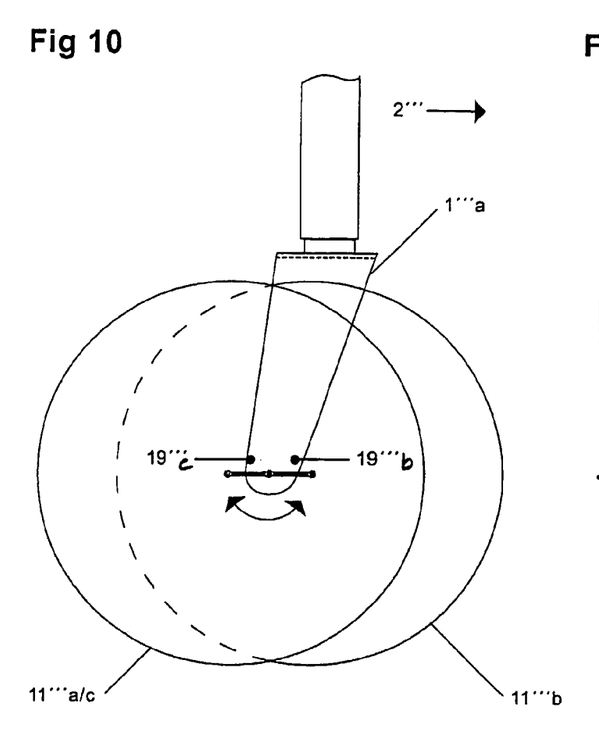
FIG. 10 shows a side view of an alternative set of wheels in connection with a so called umbrella stroller.

A significant feature of the embodiment according to FIGS. 10-12 is that the set of wheels is not subjected to any lateral forces that may cause the set of wheels and hence also the subframe 1'''a to rotate around a vertical axis. The reason therefore is that an unevenness either is hit by the centrally located wheel 11'''b or simultaneously by the outer wheels 11'''a and 11'''c. This means that there is in principle no torque action in connection with the embodiment according to FIGS. 10-12.

Figure 14:
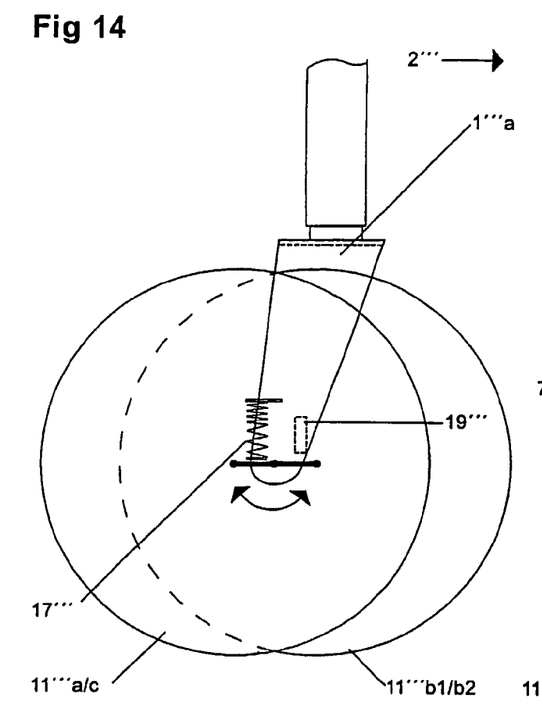
FIG. 14 shows a side view of a further alternative set of wheels in connection with a so called umbrella stroller.
Figure 15:
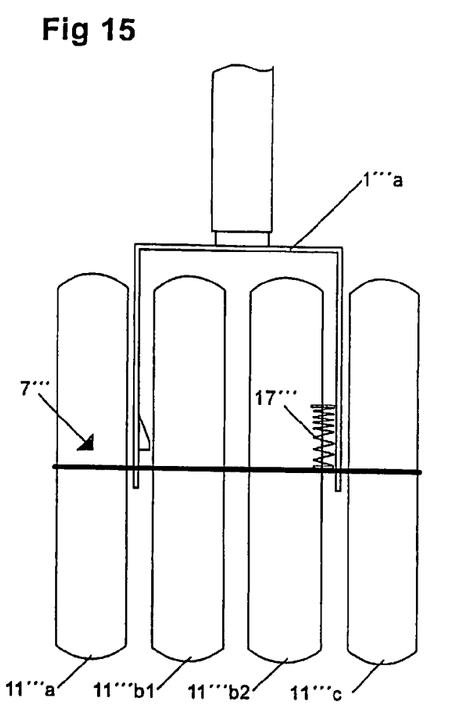
FIG. 15 shows a front view of the set of wheels according to FIG. 14.
Figure 16:
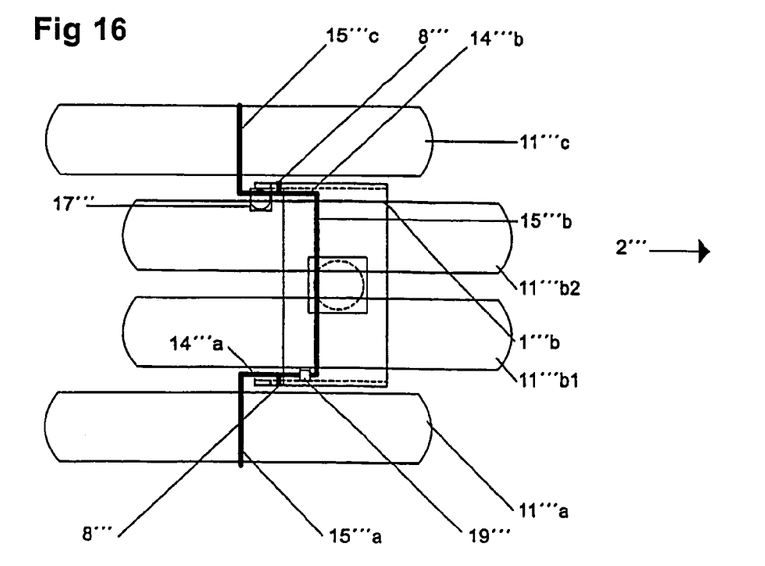
FIG. 16 shows a top view of the set of wheels according to FIG. 14.

In FIGS. 14-16 a further alternative embodiment is shown, this being a variant of the embodiment according to FIGS. 10-12. What principally differs between the embodiment according to FIGS. 14-16 and the embodiment according to FIGS. 10-12 is that a further centrally located wheel is provided. Since these both embodiments are so alike the same reference numerals have been used with the exception that in the embodiment according to FIGS. 14-16 the centrally located wheels have been given the reference numerals 11'''b1 and 11'''b2 respectively. As regards the function of the embodiment according to FIGS. 14-16 this embodiment possesses the quality that the sub-frame 1'''a is extremely easily rotatable around a vertical axis, especially when the set of wheels is subjected to a heavy load.

In order to use the properties of the different embodiments of the present invention in an optimal way it might be suitable that in connection with a so-called umbrella stroller, walker or consignment cage the both rear sets of wheels are designed in accordance with the embodiment shown in FIGS. 7-9 while the front sets of wheels are designed in accordance with the embodiment shown in FIGS. 10-12 or FIGS. 14-16.

Figure 17:
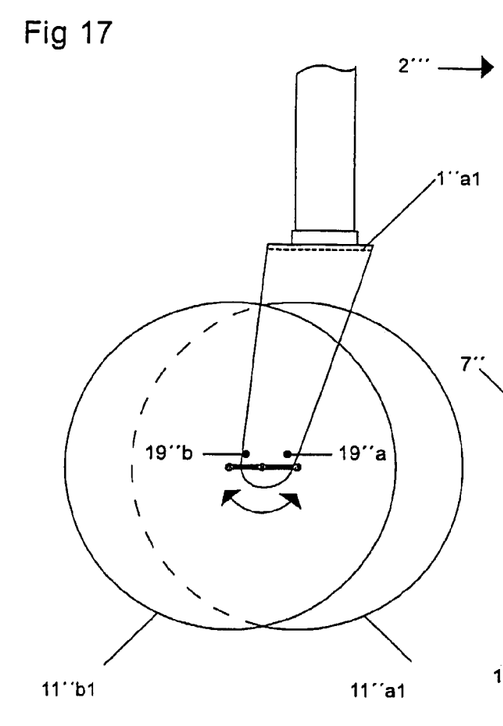
FIG. 17 shows a side view of a further alternative set of wheels according to the present invention.
Figure 18:
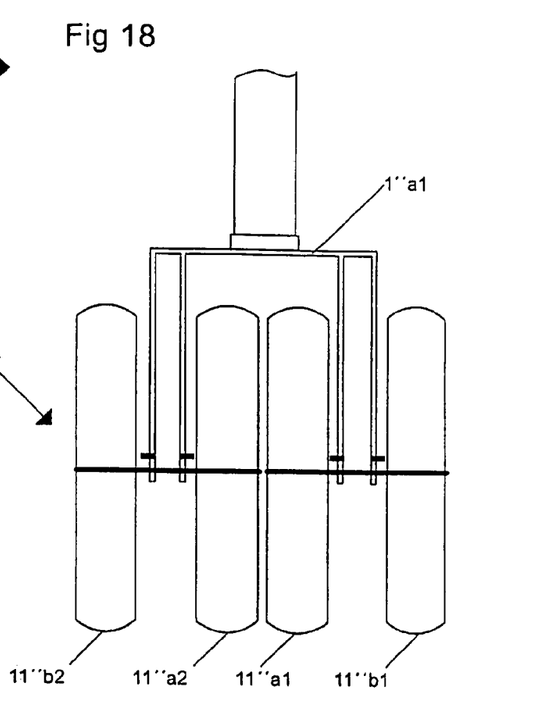
FIG. 18 shows a front view of the set of wheels according to FIG. 17.
Figure 19:
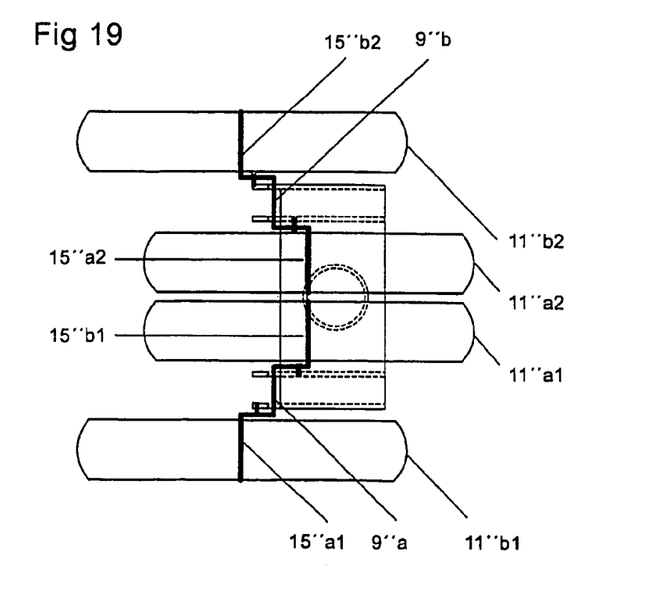
FIG. 19 shows a top view of the set of wheels according to FIG. 17.

In FIGS. 17-19 a further embodiment of a wheel suspension according to the present invention is shown. This embodiment in principle being a doubling of the embodiment according to FIGS. 7-9. For that reason similar but modified reference numerals have been used in FIGS. 17-19 as in FIGS. 7-9. As regards the function of the wheel suspension according to FIGS. 17-19 it corresponds in principle to the function of the embodiment according to FIGS. 7-9.

As regards the use of the wheel suspension according to the present invention in connection with prams the distance between the centre axles 15a, 15b; 15"a, 15"b; 15'''a/15'''c, 15'''b is normally about 50 mm in the travelling direction of the pram. This distance is rather small and therefore this structural feature is normally not registered by a viewer. For the above described embodiments according to FIGS. 1-5 and 7-9 it is generally the case that the torque axle brings about an inherent spring action of the axle 7; 7". This means that the conventional spring suspension that prams are equipped with may be deleted.

Figure 20:
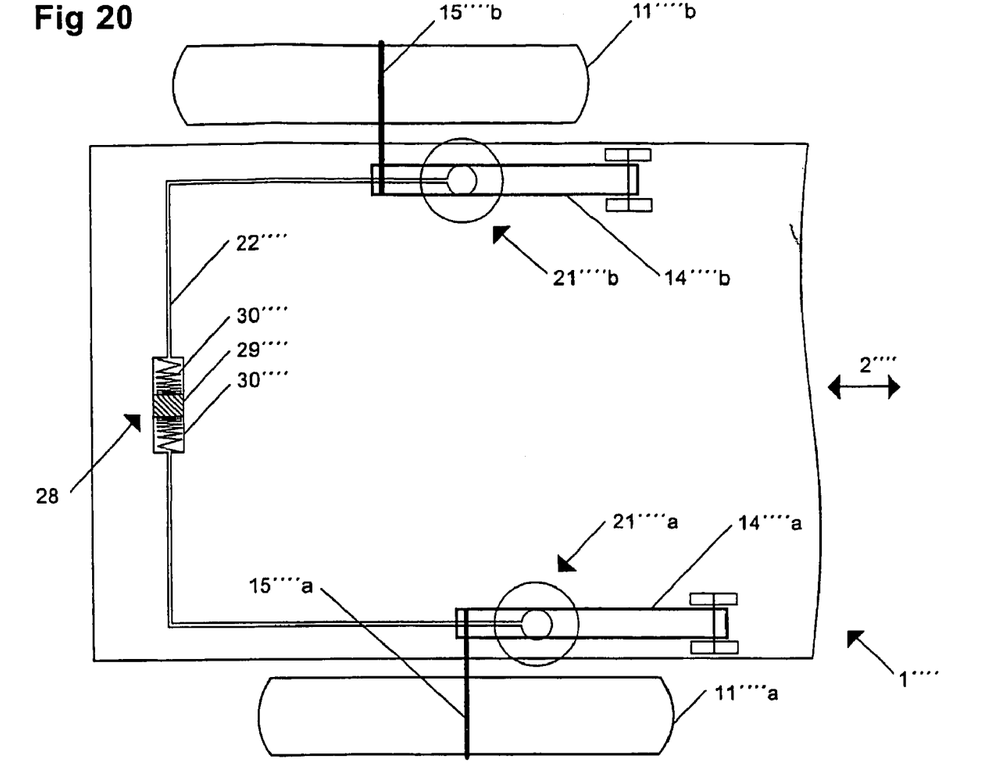
FIG. 20 shows a schematic top view of a portion of a vehicle chassis having an alternative wheel suspension according to the present invention.
Figure 21:
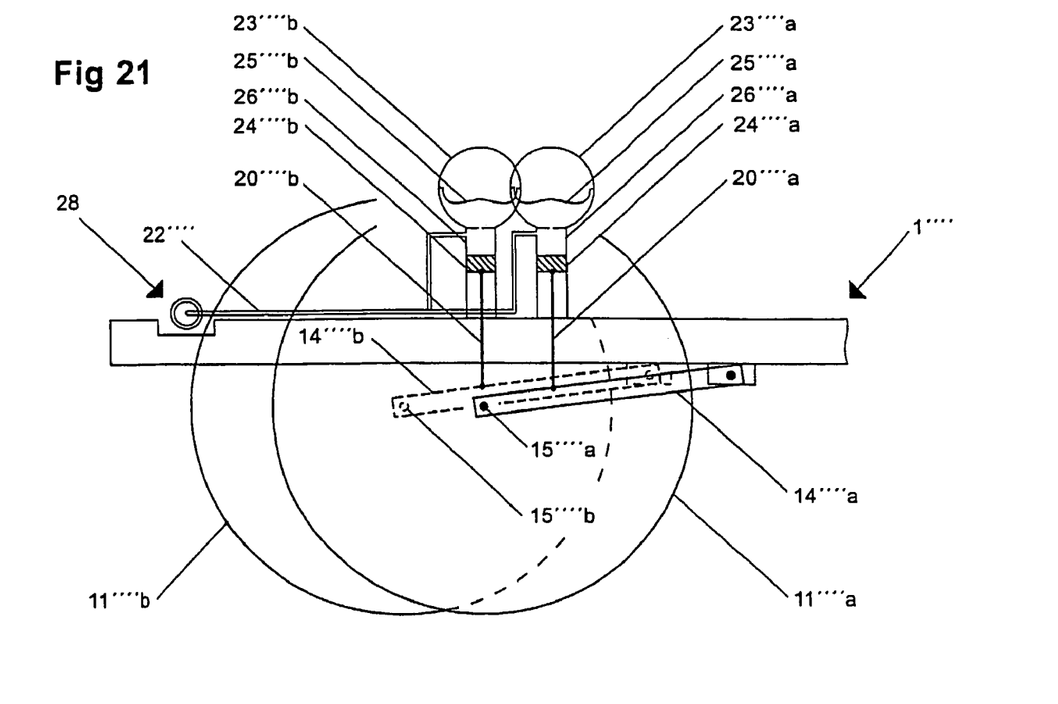
FIG. 21 shows a side view of a pair of wheels in connection with the wheel suspension according to FIG. 20.

In FIGS. 20 and 21 a further alternative embodiment of the present invention is shown, said embodiment constituting a hydraulic variant. The wheel suspension according to FIGS. 20 and 21 comprises two pivoting arms 14""a and 14""b that at one end are pivotally connected to a frame 1"" while the other end of the pivoting arms 14""a and 14""b respectively carries a centre axle 15""a and 15""b of a wheel 11""a and 11""b respectively. An intermediate portion of the pivoting arms 14""a and 14""b is via rods 20""a and 20""b connected to hydropneumatic units 21""a and 21""b that are mounted on the frame 1"". The hydropneumatic units 21""a and 21""b are via a pipe 22"" mutually connected with each other. The unit that comprises the pivoting arms 14""a, 14""b, the wheels 15""a, 15""b, the hydropneumatic units 21""a, 21""b and the pipe 22"" is called a set of wheels. In each hydropneumatic unit 21""a, 21""b a membrane 25""a and 25""b respectively is provided, said membrane 25""a, 25""b dividing each hydropneumatic unit in two compartments. The compartment 23""a, 23""b above the membrane 25""a, 25""b constitutes a pressure reservoir and is filled with compressible gas while the compartment below the membrane 25""a, 25""b constitutes a tubular unit 26""a, 26""b that is filled with hydraulic oil. Said hydraulic oil flows in the pipe 22"" since it is connected to the respective tubular unit 26""a, 26""b of the hydropneumatic units 21""a, 21""b.

On the ends of the rods 20""a and 20""b that face away from the pivoting arms 14""a and 14""b sealing means 24""a and 24""b respectively are attached, said sealing means 24""a and 24""b being displacable in the tubular unit 26""a and 26""b respectively of the hydropneumatic units 21""a and 21""b. The pipe 22"" is connected to the hydropneumatic units 21""a and 21""b in such a way that it is in connection with the hydraulic oil enclosed in the tubular units 26""a and 26""b.

In the pipe 22"" a balancing cylinder 28 is also provided, said cylinder 28 comprising a piston 29"" and two on both sides of the piston 29"" arranged progressive springs 30"". These springs 30"" contribute in keeping the vehicle in a horizontal equilibrium position (initial position) and the springs 30"" functions in a principally corresponding way as for instance the spring 17 and the iron flat 16 in FIGS. 1-2 and 4-6.

If for instance the front wheel 11""a moves upwards the rod 20""a, including the sealing means 24""a, will also move upwards thereby increasing the pressure in the tubular unit 26"" a and compressing the gas above the membrane 25""a. In connection therewith the hydraulic oil that is located below the membrane 25""a will flow, via the pipe 22"", towards the balancing cylinder 28 and an increased pressure is propagating to the tubular unit 26""b and the rod 20""b moves downwards together with the centre axle 15""b. The centre axles 15""a and 15""b thus moves away from each other in vertical direction when one wheel 11""a enters a stone or the like.

A principally important feature of the wheel suspension according to the present invention is that when passing unevennesses the wheels of a set are not simultaneously subjected to impulsive forces but in a timely extended process.

To a sum up it may be noticed that an important difference between the wheel suspension according to the present invention and a bogie is that the wheels of a wheel suspension according to the present invention are not located in the same plane and that the wheels overlap each other seen in the direction of the wheel axles. Regarding a bogie the wheels are located in the same plane and consequently it is not possible that they overlap each other seen in the direction of the wheel axles.

FEASIBLE MODIFICATIONS OF THE INVENTION

Although the invention primarily has been described above in connection with prams the invention must in no way be regarded as restricted to prams. The embodiment described in FIGS. 20-21 is primarily intended for the car industry.

In connection with the description above of FIG. 3 it is stated that the intermediate portion 9 preferably is manufactured from spring steel while the Z-shaped portion 10 preferably is manufactured from a stiffer steel quality. However, within the scope of the invention it is feasible that the axle 7; 7"; 7'" is manufactured from other materials. In exemplifying and non-restricting purposes plastic materials may be mentioned. Thereby, different parts of the axle may in a corresponding way be given different properties, e.g. regarding torque capacity.

The invention claimed is:

1. A wheel suspension for a vehicle, comprising:
   an axle having a pair of non-coaxial outer portions for a set of wheels, a rotatable inner portion parallel to said outer portions, and a pair of transverse portions that each connect a respective one of said outer portions to said inner portion, said pair of transverse portions extending in opposite directions transverse to said outer portions, said pair of transverse portions moving in opposite directions from a substantially horizontal neutral position as said inner portion rotates; and
   a progressive spring having one end attached to said inner portion and a second end adapted to be attached to a frame of the vehicle, said spring permitting rotation of said inner portion a first amount and restricting rotation of said inner portion beyond the first amount and urging both of said transverse portions to the neutral position.

2. The wheel suspension of claim 1, wherein said inner portion has an extension orthogonal to said inner portion and wherein said one end of said spring is attached to said extension.

3. The wheel suspension of claim 2, wherein said extension is transverse to a plane defined by said pair of transverse portions.

4. The wheel suspension of claim 2, wherein said extension is parallel to a plane defined by said pair of transverse portions.

5. A wheel suspension for a vehicle, comprising:
   an axle having a pair of non-coaxial outer portions for a set of wheels, a rotatable inner portion parallel to said outer portions, and a pair of transverse portions that each connect a respective one of said outer portions to said inner portion, said pair of transverse portions extending in opposite directions transverse to said outer portions, said pair of transverse portions moving in opposite directions from a substantially horizontal neutral position as said inner portion rotates; and
   a progressive spring having one end interacting with a first one of said pair of transverse portions and a second end adapted to be attached to a frame of the vehicle, said spring permitting movement of said pair of transverse portions a first amount and restricting movement of said pair of transverse portions beyond the first amount and urging said pair of transverse portions to the neutral position.

6. The wheel suspension of claim 5, further comprising a stopper that is spaced from a second one of said pair of transverse portions and permitting movement of said second transverse portion the first amount and stopping further movement of said second transverse portion beyond the first amount.

7. A wheel suspension for a vehicle, comprising:
   an axle having a pair of non-coaxial outer portions for a set of wheels, a rotatable inner portion parallel to said outer portions, and a pair of transverse portions that each connect a respective one of said outer portions to said inner portion, said pair of transverse portions extending in opposite directions transverse to said outer portions, said pair of transverse portions moving in opposite directions from a substantially horizontal neutral position as said inner portion rotates; and a first stopper that is spaced from a first one of said pair of transverse portions and a second stopper that is spaced from a second one of said pair of transverse portions, said first and second stoppers permitting a first movement of both of said pair of transverse portions and stopping further movement of both of said transverse portions beyond said first movement.

8. The wheel suspension of claim 7, wherein said first and second stoppers are on a same side of said pair of transverse portions.

* * * * *